June 5, 1923.

O. OHMART 1,457,597

BATTERY AND BULB TESTER

Filed Sept. 15, 1921

Witness
J. R. Hoge

Inventor
Otto Ohmart

By H. B. Willson &co.
Attorneys

June 5, 1923.
O. OHMART
1,457,597
BATTERY AND BULB TESTER
Filed Sept. 15, 1921
2 Sheets-Sheet 2
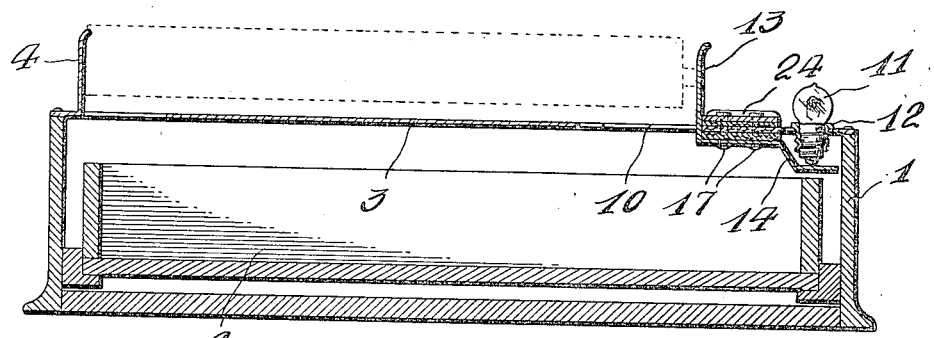
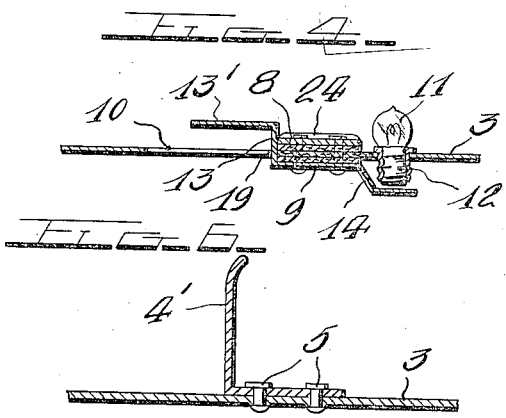
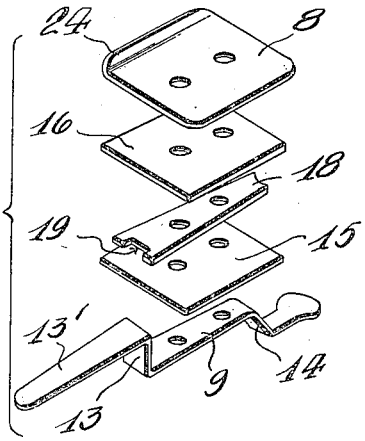
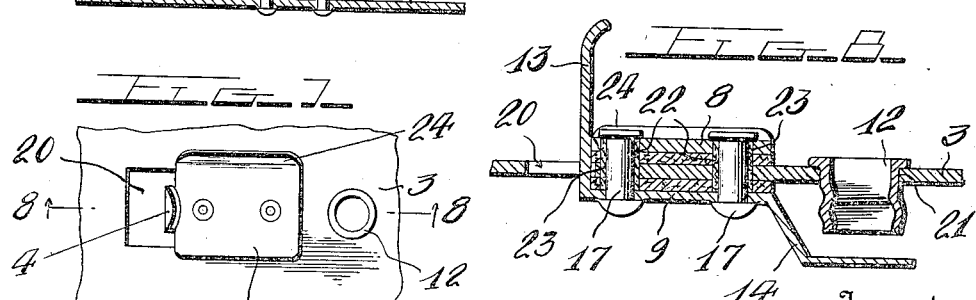
Inventor
Otto Ohmart
Witness
J. R. Hoge
By H. B. Willson & Co.
Attorneys Patented June 5, 1923.

1,457,597

UNITED STATES PATENT OFFICE.

OTTO OHMART, OF CAIRO, ILLINOIS.

BATTERY AND BULB TESTER.

Application filed September 15, 1921. Serial No. 500,780.

*To all whom it may concern:*

Be it known that I, OTTO OHMART, a citizen of the United States, residing at Cairo, in the county of Alexander and State of Illinois, have invented certain new and useful Improvements in Battery and Bulb Testers; and I do declare the following to be a full, clear, and exact description of the invention, such as will enable others skilled in the art to which it appertains to make and use the same.

This invention relates to an improved testing device for testing batteries and bulbs and will be used for testing batteries to ascertain if they have the proper strength and for testing bulbs to see if they are in proper working order.

One object of the invention is to provide a tester so constructed that cylindrical or flat batteries may be tested and to further so construct this device that bulbs may be tested by simply placing them upon the base plate of the tester and in engagement with a contact forming part of the tester.

Another object of the invention is to so construct this device that a contact strip may be cut from the body of the base plate and after being bent to the proper shape, put in place with a portion of the contact strip extending up through the cutout of the base plate.

Another object of the invention is to provide an improved means for mounting the contact strip cut from the base plate.

Another object of the invention is to so construct the device that a pair of contacts positioned one above the other may be mounted above and below the base plate and secured by common fasteners, the two contacts being insulated from the base plate.

Another object of the invention is to so construct this device that the base plate may form the top of a cabinet in which may be mounted a drawer for carrying a stock of bulbs.

This invention is illustrated in the accompanying drawings, wherein:

Figure 3 is a longitudinal sectional view taken along the line 3—3 of Fig. 1.

Figure 4 is a sectional view taken along the line 4—4 of Fig. 1.

Figure 5 is a view showing as a group, the contacts and insulating plate shown in Fig. 4.

Figure 6 is an enlarged sectional view showing a modified form of contact.

Figure 7 is a top plan view showing an arrangement which may be substituted for that shown in Fig. 4.

Figure 8 is a sectional view taken along the line 8—8 of Fig. 7.

Figure 1:
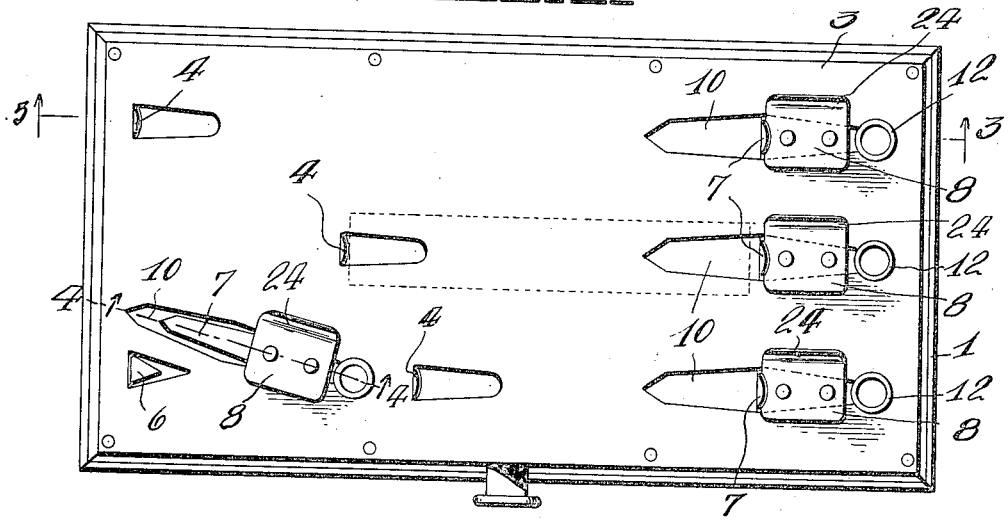
Figure 1 is a top plan view of the improved tester.
Figure 2:
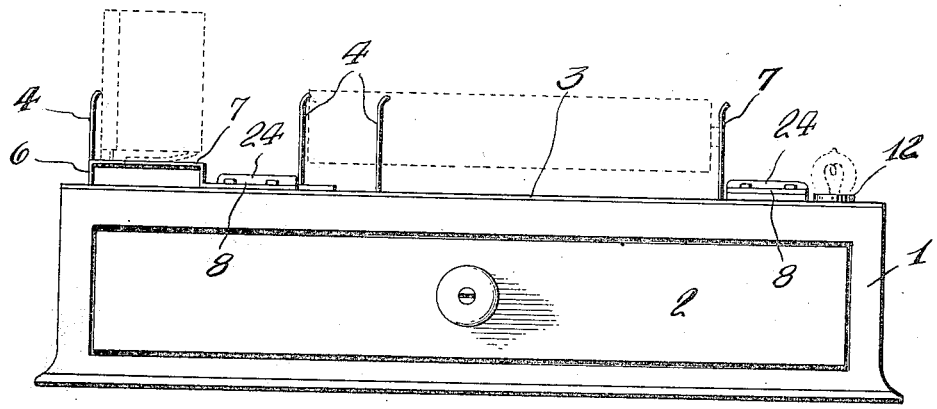
Figure 2 is a side elevation of the structure shown in Fig. 1.

This improved tester is used in connection with a cabinet 1 in which will be placed a sliding drawer 2 for carrying bulbs which are to be sold. The base plate 3 of the tester forms the top of the cabinet and is formed from sheet metal cut the proper size. Tongues 4 are struck from the sheet metal plate 3 and are bent upwardly thus providing contacts for engaging the base ends of cylindrical batteries. If desired, the contacts for engaging the base of the cylindrical battery can be formed from a separate sheet as shown in Fig. 6. This strip or contact 4' is bent intermediate its length to provide a base through which will pass fastener rivets 5 to connect the contact strip with the base plate. The contact strip 6 for engaging one of the terminals of a flat battery may be formed by striking a tongue from the plate after the manner of forming the contact strips 4 or may be formed after the manner disclosed in Fig. 6. A second contact will be provided for cooperating with the contact 6 and with each of the contacts 4, and connected with each of the last mentioned contacts which will be indicated in general by the numeral 7 there will be provided a contact plate 8 for use in testing bulbs as will be hereinafter brought out.

In Figs. 4 and 5 there has been shown one manner of forming and assembling the contacts 7 and 8 and in Figs. 7 and 8 there has been shown a modified manner of forming and assembling these contacts 7 and 8.

Referring to Figs. 4 and 5, it will be seen that the contact 7 may be formed by stamping a strip 9 from the base plate thus leaving an opening 10 in the base plate, this opening having one end portion terminating in a circular pocket which may be of the proper size to receive the threaded base of a bulb 11 or may be of the proper size to receive a socket 12 into which the bulb 11 may be screwed. The strip 9 after being cut from the base plate will be bent intermediate its length thus providing upwardly and downwardly extending arms 13 and 14, the upper arm 13 forming a contact strip for engaging the second contact of a flat battery or for engaging the terminal at the upper end of a cylindrical battery. If for use in connection with a cylindrical battery, the arm 13 will extend straight up through the opening 10 whereas if for use in connection with a flat battery, the arm will be bent to provide a portion 13′ extending horizontally. In order to provide insulation between the strip 9 and the under face of the base plate, there has been provided an insulating plate 15 and in order to insulate the contact plate 8 from the upper face of the base plate, there has been provided an insulating plate 16. It should be noted that the contact plate 8 and the insulating plates 15 and 16 are wider than the slot 10 so that when the securing rivets 17 are put in place, the slot 10 will be bridged and the contacts securely held in place. In order to fill the portion of the slot 10 between the pocket for carrying the bulb and the upstanding arm 13, there has been provided a tapered strip 18 which is formed of fibre. This strip 18 fits into the slot and is held in place by the rivets 17. At one end, the fibre strip 18 is cut upon the arc of a circle but at its other end the strip is cut to provide a seat 19 through which the arm 13 will pass. It will thus be seen that the arm 13 will be properly held in place and cannot move transversely to bring its side edges into contacting engagement with the base plate. The strip 9 and the contact plate 8 will thus be very effectively insulated from the base plate. In the form shown in Figs. 7 and 8, the base plate instead of being provided with an elongated slot 10 will be punched to provide an opening 20 and a circular opening 21 and between these openings 20 and 21 will be provided with openings 22. The opening 21 will be of a proper size to receive the socket 12 or threaded base of the bulb and the opening 20 will be of the proper size to permit the arm 13 to be easily passed up through the base plate. In this form, the rivets will pass through the openings of the base plate and in order to prevent any danger of contact between the rivets and the base plate, there will be provided insulating sleeves 23 about these rivets.

When this device is in use, the bulbs to be sold will be kept in the drawer 2 of the cabinet. Bulbs 11 will be put in place and will have their contacts engaging the end portion 14 of the contacts 7. If a cylindrical battery is to be tested, it will be put in place between one of the contacts 4 and the co-operating contact 7. From an inspection of Fig. 1, it will be seen that provision has been made for cylindrical batteries of three different lengths. As soon as the battery is in place, the circuit will be established from the battery through the contact 7 to the bulb and from the bulb to the base plate and back to the battery through the contact 4. The bulb will thus be illuminated if the battery is of the proper strength. If a flat battery is to be tested, the battery will be positioned vertically with one of its terminals engaging the contact 6 and its second terminal engaging the contact 7 co-operating with the contact 6. The bulb co-operating with these contacts will be illuminated if the battery is of the proper strength, but if the battery is out of order or is weak, the bulb will either be only imperfectly illuminated or will not be illuminated at all. When it is desired to test a bulb, it is simply necessary to place the bulb upon the base plate with the terminal resting upon the base plate and the side of the socket engaging portion of the bulb engaging the upturned lip 24 of any one of the contact plates 8 to which a battery is connected. The circuit will then be through a battery to the contact 7 and up through the rivets to the contact plate 8 and through the bulb to the base plate 1 and through the contact 4 back to the battery.

I claim:

1. A battery and bulb tester comprising a metal base plate, a contact carried thereby, a contact secured beneath and insulated from the base plate and having one end portion extending up through an opening in the base plate, the base plate having a bulb holding socket in operative relation to the portion of the second contact below the base plate, and a contact above and insulated from the base plate and having operative connection with the second contact.

2. A battery and bulb tester comprising a metal base plate, a contact carried thereby, a contact secured beneath and insulated from the base plate and having one end portion extending up through an opening in the base plate, the base plate having a bulb holding socket in operative relation to the portion of the second contact below the base plate, and a contact above and insulated from the base plate and common means for securing the second and last mentioned contacts and connecting the same for passage of current from one to the other.

3. A battery and bulb tester comprising a metal base plate, a contact extending upwardly from the base plate, the base plate having an opening therein in spaced relation to said contact, a contact positioned beneath and insulated from said base plate and having an extension extending up through the opening of the base plate, and a contact above and insulated from the base plate, the base plate having a lamp socket above and in operative relation to the lower insulated contact.

4. A battery and bulb tester comprising a metal base plate, a contact extending upwardly from the base plate, the base plate having an opening therein in spaced relation to said contact, a contact strip positioned beneath said base plate and having one end portion bent to extend in spaced relation to the under face of the base plate and its other end portion bent to extent through said opening above the base plate, a contact plate above said base plate, insulating plates between the base plate and contact strip and plate and fastener means passing through the base plate insulation and contacts, the base plate having a lamp socket above the bent lower end portion of said contact strip.

5. A battery and bulb tester comprising a metal base plate having an elongated opening therein, an insulating plate positioned in said opening and terminating in spaced relation to the ends thereof to provide bulb receiving opening and a contact passage, insulating plates above and below the base plate bridging said opening, a contact plate upon the upper insulating plate having one side portion extending beyond the same, a contact strip against the lower insulating plate having one end portion extending beneath the bulb receiving opening and its other end portion extending up through the contact passage and through a notch in the end of the first mentioned insulating plate, and fasteners passing through the insulating plates and upper and lower contacts.

In testimony whereof I have hereunto set my hand.

OTTO OHMART.